United States Patent
Sprygin

(10) Patent No.: US 10,427,288 B2
(45) Date of Patent: Oct. 1, 2019

(54) HANDSAW

(71) Applicant: Valeriy I. Sprygin, Moscow (RU)

(72) Inventor: Valeriy I. Sprygin, Moscow (RU)

( * ) Notice: Subject to any disclaimer, the term of this patent is extended or adjusted under 35 U.S.C. 154(b) by 0 days.

(21) Appl. No.: 16/265,309

(22) Filed: Feb. 1, 2019

(65) Prior Publication Data
US 2019/0160647 A1    May 30, 2019

Related U.S. Application Data

(63) Continuation of application No. PCT/RU2017/000492, filed on Jul. 26, 2017.

(30) Foreign Application Priority Data

Aug. 1, 2016   (RU) ................................ 2016131440

(51) Int. Cl.
| | | |
|---|---|---|
| B25G 1/08 | (2006.01) | |
| B27B 21/04 | (2006.01) | |
| B43K 23/00 | (2006.01) | |
| B23D 51/01 | (2006.01) | |

(52) U.S. Cl.
CPC ............. B25G 1/08 (2013.01); B23D 51/01 (2013.01); B27B 21/04 (2013.01); B43K 23/001 (2013.01)

(58) Field of Classification Search
CPC .......... B25G 1/08; B27B 21/04; B43K 23/001
See application file for complete search history.

(56) References Cited

U.S. PATENT DOCUMENTS

| | | | | |
|---|---|---|---|---|
| 1,395,957 A | * | 11/1921 | Griffin | B27B 21/08 24/3.9 |
| 1,622,466 A | * | 3/1927 | Patterson | B27B 21/08 30/517 |
| 2,592,745 A | | 4/1952 | Salin | |
| 4,798,310 A | * | 1/1989 | Kasai | B43K 23/001 206/224 |
| 7,117,560 B2 | * | 10/2006 | Yu Chen | B25G 1/08 16/111.1 |
| 7,591,037 B1 | * | 9/2009 | Strickland | B25C 5/06 7/156 |

(Continued)

FOREIGN PATENT DOCUMENTS

| | | |
|---|---|---|
| RU | 71592 U1 | 3/2008 |
| RU | 132024 U1 | 9/2013 |
| RU | 132027 U1 | 9/2013 |

OTHER PUBLICATIONS

International Search Report from International Application No. PCT/RU2017/000492 filed Jul. 26, 2017, dated Nov. 23, 2017.

*Primary Examiner* — Omar Flores Sanchez
(74) *Attorney, Agent, or Firm* — Patentbar International, P.C.

(57) ABSTRACT

A handsaw contains a blade and a handle, in which a cavity is made for inserting a marking pencil into it for the purpose of operative use thereof while in operation. The said cavity is provided with a bushing of resilient material to fix the pencil inside wherein the outlet opening of the bushing is smaller than its inlet opening. The presence of such a bushing of resilient material, tightly enclosing the body of the pencil allows the pencil to fix in the handle. In addition, it prevents the falling the shortened pencil inside the said cavity in the handle of the handsaw. It allows the pencil to use until it reaches the least possible length.

6 Claims, 1 Drawing Sheet

(56) References Cited

U.S. PATENT DOCUMENTS

| | | | | |
|---|---|---|---|---|
| 7,712,506 B2* | 5/2010 | Huang | ............... | B65H 35/0033 156/523 |
| 2008/0053622 A1* | 3/2008 | Huang | ............... | B65H 35/0033 156/577 |

* cited by examiner

HANDSAW

RELATED APPLICATIONS

This Application is a Continuation application of International Application PCT/RU2017/000492, filed on Jul. 26, 2017, which in turn claims priority to Russian Patent Application RU 2016131440, filed Aug. 1, 2016, both of which are incorporated herein by reference in their entirety.

FIELD OF THE INVENTION

The proposed utility model relates to the woodworking industry, namely to a hand tool for wood sawing.

BACKGROUND OF THE INVENTION

A handsaw containing a tooth blade rigidly fixed to a handle in which a cylindrical cavity is made with the possibility of placing a marking pencil in it, is known (patent of the utility model Russian Federation No. 132024 "Nozhovka", IPC: B27B 21/04, published 10 Sep. 2013. Bul. No. 25.). The pencil in the handle of the saw allows to apply it with maximum efficiency during work, thus increasing the productivity.

The disadvantage of this solution is that the pencil is not fixed in the mentioned cavity. Since the pencils have various diameters, the said cavity in the handle has to be made wide with a certain clearance between the pencil body and the cavity wall in order to insert a pencil of any diameter. A non-fixed pencil swings in such a cavity and creates certain inconveniences when working with a saw or even can fall out of this cavity in case vigorous reciprocating movements of the handsaw or when storing it.

In addition, as the pencil is used, its body is shortened and at a certain point its length decreases so much that it simply falls through this cavity and it becomes inconvenient to remove it from there or even have to be replaced with a new pencil without using the old one to the end.

SUMMARY OF THE INVENTION

The object of the utility model is to provide a fixed position of the pencil in the cavity of the handsaw handle.

The assigned object is solved due to the fact that a handsaw containing a tooth blade rigidly fixed to a handle in which a cavity of an elongated shape is made with the possibility of placing a marking pencil in it, is additionally provided with a bushing of resilient material installed in the upper part of the elongated cavity in the handle.

The presence of such a bushing of resilient material, tightly enclosing the body of the pencil, allows the pencil to fix in the handle. In addition, it prevents the falling a shortened pencil into the indicated cavity in the handle of the handsaw, which allows the pencil to be used until it reaches the least possible length. Since the bushing is made of resilient material, it has the ability to change own internal diameter under the action of the applied force and accommodate pencils of different diameters with fixing them in the handle of the handsaw.

BRIEF DESCRIPTION OF THE DRAWINGS

Further the utility model is explained with reference to the drawings in which.

DETAILED DESCRIPTION OF THE PREFERRED EMBODIMENTS

Figure 1:
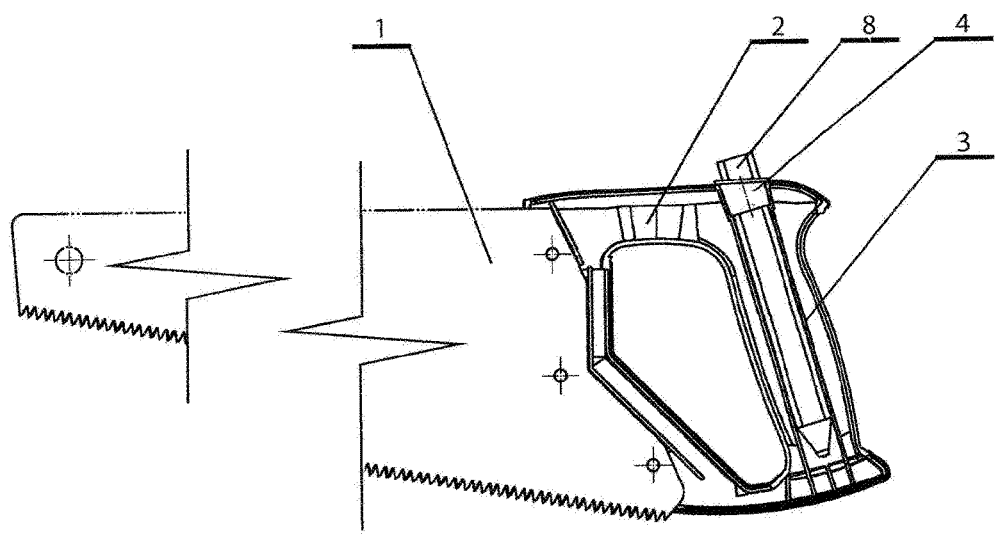
FIG. 1 shows a general side view of a handsaw with a partial longitudinal section of the handle showing a cavity with a pencil placed therein.
Figures 2, 3:
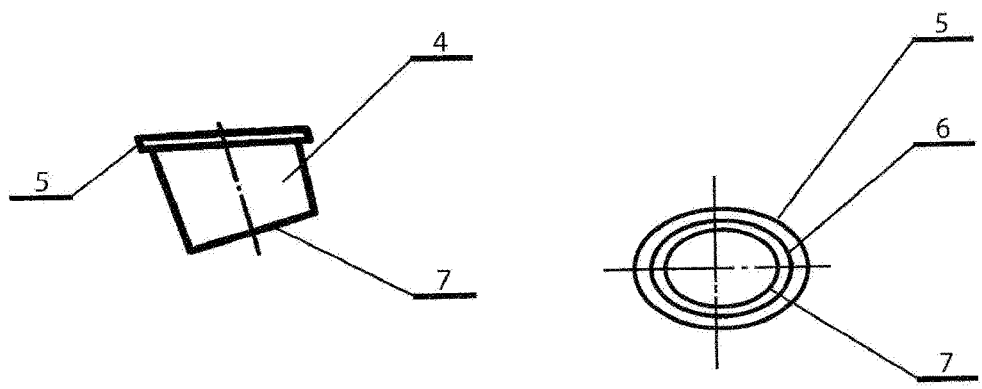
FIG. 2 shows an enlarged side view of the bushing of FIG. 1.
FIG. 3 shows a plan view of the bushing of FIG. 2.

The handsaw comprises a blade 1 and a handle 2 rigidly connected to it, in which a longitudinal cavity 3 is formed almost to the entire height of said handle. In the upper part of the cavity 3 is inserted a bushing 4 made of rubber. For the clutch in the handle 3, the upper edge of the bushing 4 is bent in the form of a collar 5. The inlet opening 6 of the bushing 4 has a slightly larger diameter than the outlet opening 7. Due to this, the marking pencil 8 inserted into the cavity 3, regardless of its diameter, is clamped in the bushing 3 with any length exceeding or equal to the height of the bushing.

The bushing 3 can be made not only of rubber, but of any material capable of restoring the original shape to a greater or lesser degree after the removal of the load, for example from a polyvinyl chloride resin and the like.

The marking pencil 8 is inserted into the wide inlet opening 6 of the bushing 4 and pushed down to the desired depth. In this case, the narrower outlet opening 7 of the bushing 4 tightly surrounds the pencil 8 and retains it in the cavity 3 both during operation by the handsaw and when it stored in any position: suspended, lying, turned upside down, etc. In this case, the length of the pencil is not important, provided that it is not smaller than the length of the bushing 4.

What is claimed is:

1. A handsaw comprising:
    a tooth blade rigidly fixed to a handle;
    the handle comprising an elongated cavity;
    the elongated cavity being capable of housing a marking pencil; and
    a resilient bushing installed in an upper part of the elongated cavity in the handle, wherein an upper edge of the resilient bushing is bent outwards.

2. The handsaw according to claim 1, wherein the resilient bushing comprises an inlet opening and an outlet opening, and wherein a diameter of the inlet opening is larger than the diameter of the outlet opening.

3. A handsaw comprising:
    a tooth blade rigidly fixed to a handle;
    the handle comprising an elongated cavity;
    the elongated cavity being capable of housing a marking pencil; and
    a resilient bushing installed in an upper part of the elongated cavity in the handle,
    wherein the resilient bushing is made of rubber.

4. The handsaw according to claim 2, wherein the resilient bushing is made of rubber.

5. The handsaw according to claim 1, wherein the resilient bushing comprises an inlet opening and an outlet opening, and wherein a diameter of the inlet opening is larger than the diameter of the outlet opening.

6. The handsaw according to claim 1, wherein the resilient bushing is made of rubber.

* * * * *